(12) United States Patent
Rummler

(10) Patent No.: US 8,950,572 B2
(45) Date of Patent: Feb. 10, 2015

(54) SCRAP METAL ADVANCING ARRANGEMENT

(71) Applicant: Inteco Special Melting Technologies GmbH, Bruck (AT)

(72) Inventor: Knut Rummler, Kehl (DE)

(73) Assignee: Inteco Special Melting Technologies GmbH, Bruck (AT)

( * ) Notice: Subject to any disclaimer, the term of this patent is extended or adjusted under 35 U.S.C. 154(b) by 0 days.

(21) Appl. No.: 13/867,096

(22) Filed: Apr. 21, 2013

(65) Prior Publication Data

US 2014/0138216 A1 May 22, 2014

(30) Foreign Application Priority Data

Oct. 25, 2010 (DE) .......................... 10 2010 049 238

(51) Int. Cl.
| | |
|---|---|
| *B65G 25/00* | (2006.01) |
| *B65G 25/08* | (2006.01) |
| *F27B 3/18* | (2006.01) |
| *F27D 3/00* | (2006.01) |
| *F27D 3/04* | (2006.01) |

(52) U.S. Cl.
CPC ................ *B65G 25/08* (2013.01); *F27B 3/186* (2013.01); *F27D 3/003* (2013.01); *F27D 3/04* (2013.01)
USPC ........................................................ 198/736

(58) Field of Classification Search
CPC .......... F27D 3/04; B30B 9/3057; B65G 25/08
USPC ............ 198/736, 747, 749; 373/79, 115, 142; 100/178, 179; 110/109, 289, 290
See application file for complete search history.

(56) References Cited

U.S. PATENT DOCUMENTS

| | | | | | |
|---|---|---|---|---|---|
| 3,384,007 | A | * | 5/1968 | Boje et al. ...................... | 100/49 |
| 3,621,775 | A | * | 11/1971 | Dedio et al. .................... | 100/49 |
| 3,734,005 | A | * | 5/1973 | Vogel .............................. | 100/52 |
| 3,802,336 | A | * | 4/1974 | Toppins ........................... | 100/49 |
| 3,802,337 | A | * | 4/1974 | St-Hiliare ....................... | 100/98 R |
| 3,855,950 | A | * | 12/1974 | Hughes et al. ................. | 110/186 |
| 4,534,301 | A | * | 8/1985 | Sakash et al. ................. | 110/255 |
| 4,714,031 | A | * | 12/1987 | Healy et al. .................... | 110/109 |
| 5,513,206 | A | | 4/1996 | Mori et al. | |
| 7,497,985 | B2 | * | 3/2009 | Fuchs ............................ | 266/177 |
| 2012/0292835 | A1 | * | 11/2012 | Sato .............................. | 266/242 |

FOREIGN PATENT DOCUMENTS

| | | |
|---|---|---|
| DE | 295 03 058.5 | 6/1995 |
| DE | 103 55 549 | 6/2005 |
| EP | 0 056 773 | 7/1982 |
| JP | 2005233491 | 9/2005 |
| WO | WO 2005/052481 | 6/2005 |
| WO | WO 2010/115619 | 1/2010 |
| WO | WO 2011/118365 | 9/2011 |

* cited by examiner

*Primary Examiner* — William R Harp
(74) *Attorney, Agent, or Firm* — Klaus J. Bach

(57) ABSTRACT

In a scrap metal advancing arrangement with a scrap metal pusher supported in a linear guide structure and a first hydraulic drive system comprising at least one first cylinder piston unit wherein the scrap metal pusher has a front surface extending normal to the linear guide direction, the scrap metal pusher includes an inner pusher block which is movable relative to the first hydraulic cylinder piston unit. The push block also has a front surface which extends normal to the linear guide direction, with the gradient of the effective piston surface of ail second cylinder-piston units and the effective front surface area being greater than the quotient of the effective piston surfaces of all first cylinder piston units and the effective pusher front surface area.

9 Claims, 6 Drawing Sheets

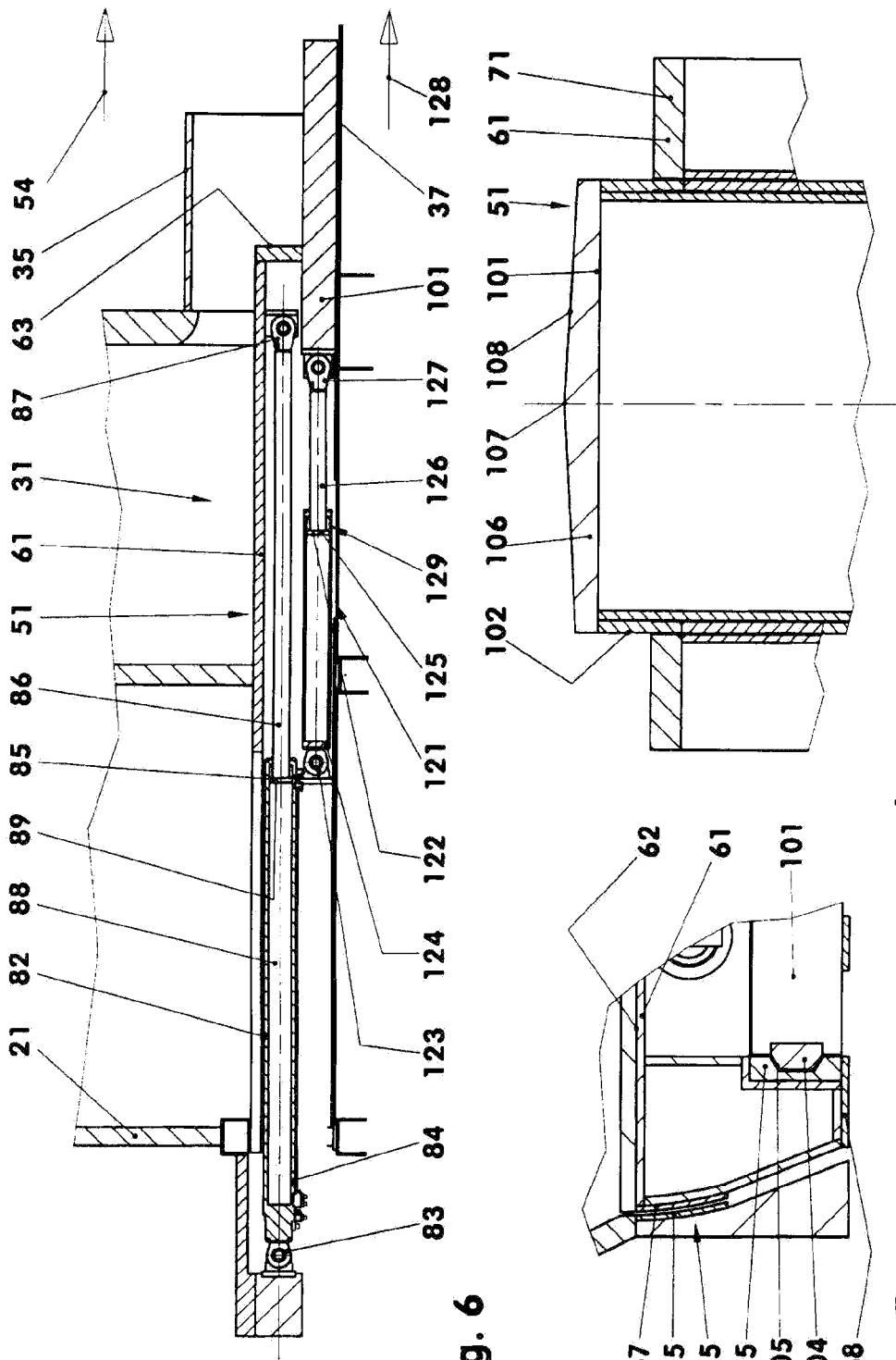

SCRAP METAL ADVANCING ARRANGEMENT

This is a Continuation-In-Part application of pending international patent application PCT/EP2011/001877 filed Oct. 24, 2011 and claiming the priority of German patent application 10 2010 049 238.8 filed Oct. 25, 2010.

BACKGROUND OF THE INVENTION

The invention relates to a scrap metal advancing arrangement with a scrap metal pusher supported in a linear guide structure and a hydraulic drive system comprising at least a cylinder-piston unit with an effective pusher front face that extends normal to the linear guide structure.

DS 108 55 549 A1 discloses a similar arrangement. However, the introduction of several types of metal scrap may result in blocking of the advancing arrangement. Then the scrap metal pusher must be moved back and forth several times to release the blocked material.

It is the object of the present invention to provide an arrangement which improves the reliability of the scrap metal advancing operations.

SUMMARY OF THE INVENTION

In a scrap metal advancing arrangement with a scrap metal pusher supported in a linear guide structure and a first hydraulic drive system comprising at least one first cylinder piston unit wherein the scrap metal pusher has a front surface extending normal to the linear guide direction, the scrap metal pusher includes an inner pusher block which is movable relative to the first hydraulic cylinder piston unit. The push block also has a front surface which extends normal to the linear guide direction, with the quotient of the effective piston surface of all second cylinder-piston units and the effective front surface area being greater than the quotient of the effective piston surfaces of all first cylinder piston units and the effective pusher front surface area.

The invention will become sore readily apparent from the following description of a particular embodiment of the scrap metal advancing arrangement with reference to the accompanying drawings.

BRIEF DESCRIPTION OF THE DRAWINGS

FIG. 6 shows the scrap metal advancing arrangement in an extended position, FIG. 7 shows a guide detail of the scrap metal advancing arrangement, FIG. 8 shows a front plate with a projection.

DESCRIPTION OF AN ADVANTAGEOUS EMBODIMENT

Figure 1:
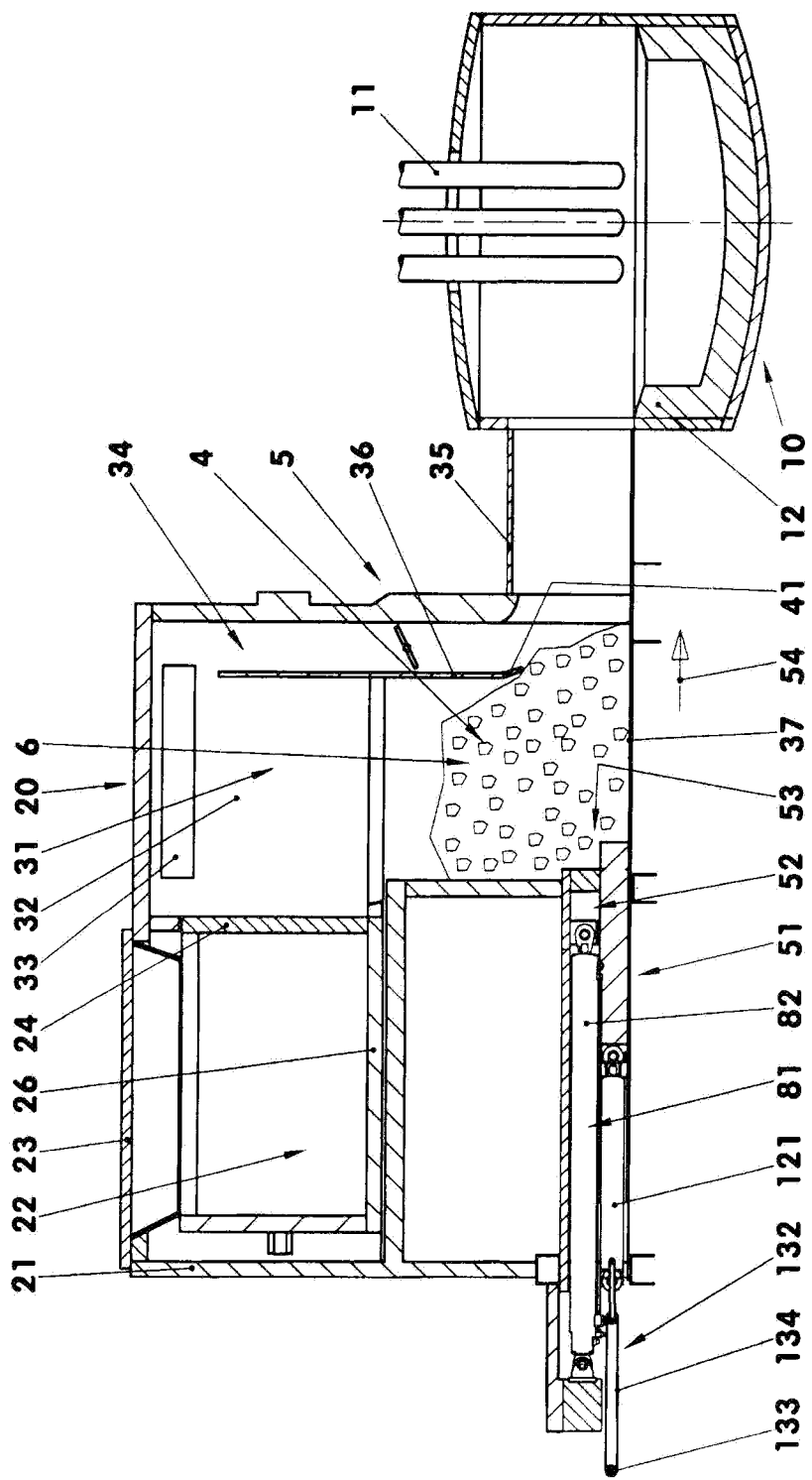
FIG. 1 is a longitudinal cross-sectional view of an electric arc furnace with a charging system according to the invention.
Figure 2:
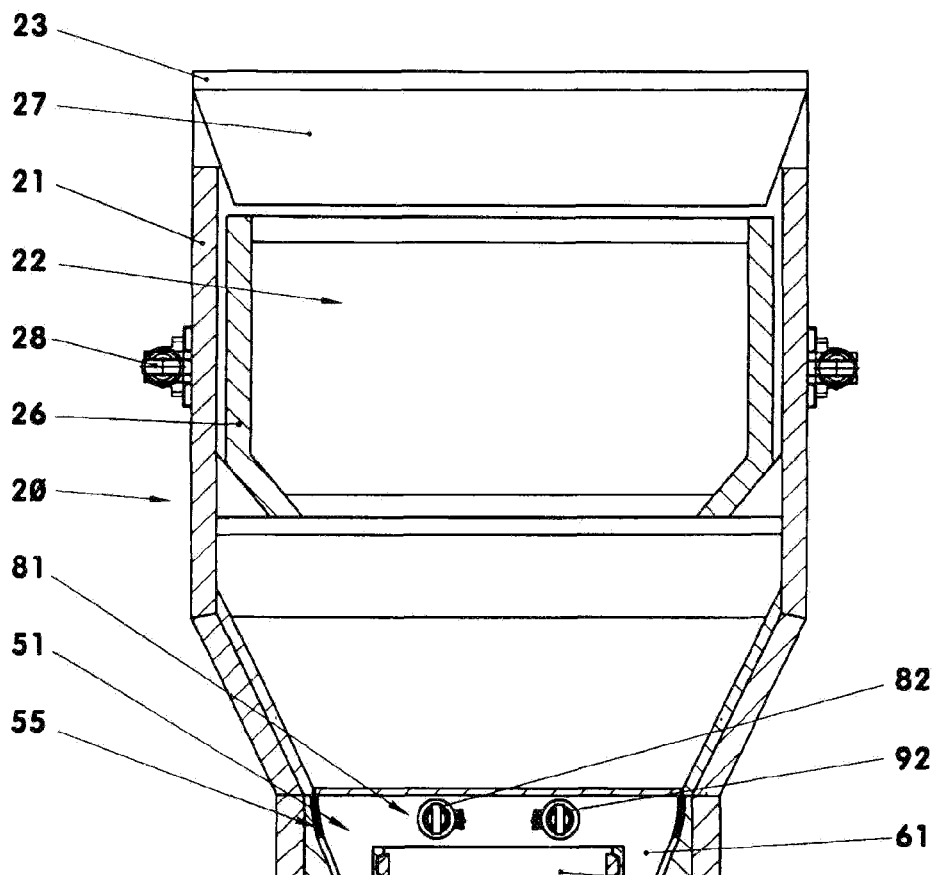
FIG. 2 shows the charging system in a cross-sectional view.

FIGS. 1 and 2 show an electric arc furnace 5 with a containment 10 and a charging chamber 20. The feed material, for example, steel scrap is supplied to the oven containment 10 in batches by the charging system. In the furnace, the scrap metal is melted by means of electric and/or fossil fuel energy. After smelting and refining or, respectively, homogenizing, the liquid steel is discharged from the furnace containment 10 at a temperature of for example 1620° C. With such an arrangement more than 100 tones of liquid steel can be produced from scrap steel per hour. Because of the low density of the supply material 4—the density of the scrap steel is less than a tenth of the density of the liquid steel—for the discharge amount mentioned a supply of more than 200 m³ of scrap material is needed.

The charging system includes a support frame 21 which, in the embodiment according to the invention, includes a pre-charging chamber 22 with a funnel 27 and a closure 23 as well as a hopper 31. The pre-charging chamber 22 and the hopper 31 are separated from each other for example by a separating wall 24 which can be opened. The support frame 21 serves among others for the distribution of water for the cooled areas of the hopper 31 which is closed at its top. At one or both side walls 32 of the hopper 31 suction connections 33 are arranged. Adjacent to the hopper 31 in a direction toward the furnace containment 10, a suction channel 34 is provided. As shown in FIG. 1, the latter has a longitudinal cross-section with a length of for example 1.2 meters. Its width normal to the drawing plane of FIG. 1 corresponds to the width of the hopper 31.

The whole charging hopper system 20 is movable for example by two meters so that the containment 10 can be removed.

Figure 9:
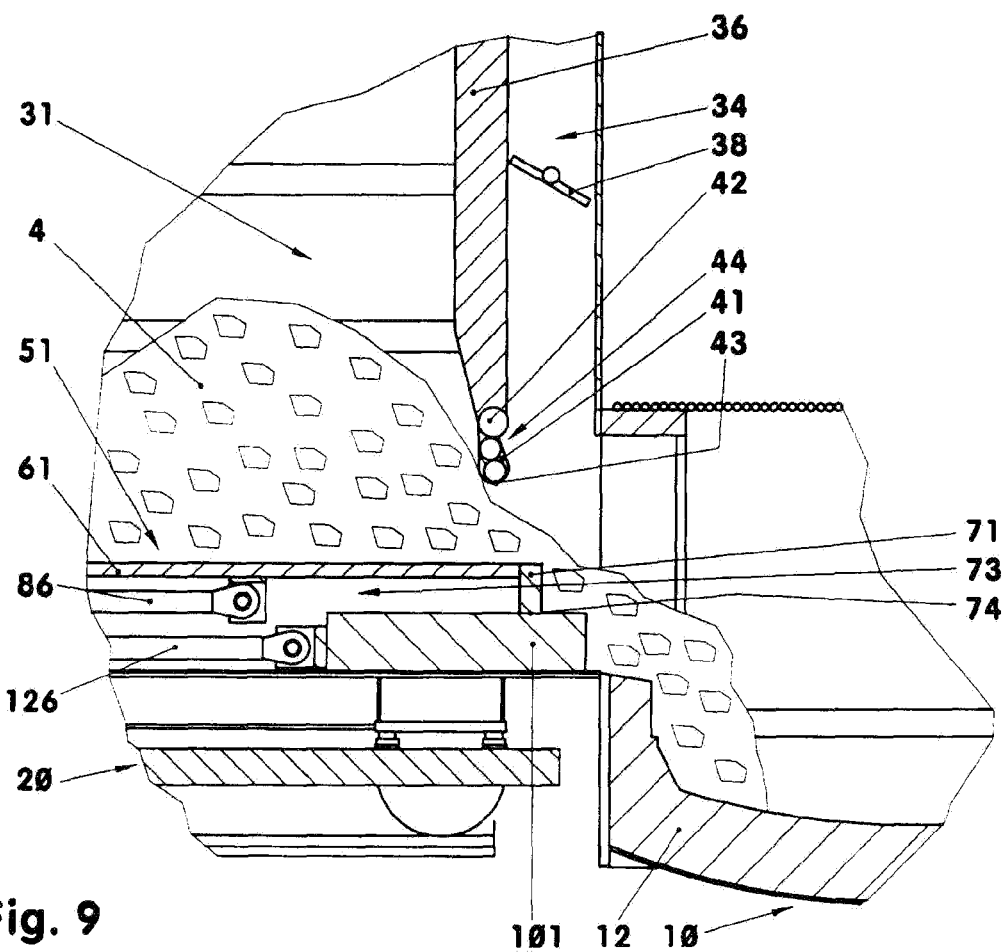
FIG. 9 shows a detail of the scrap metal advancing arrangement with a pivoting flap.

The wall 36 of the hopper containment 31 facing the suction channel 34 comprises in the embodiment according to the invention a pivot flap 41, see FIGS. 1, 9. This water-cooled flap 41 has in the exemplary embodiment a height of 500 mm below the pivot axis 42 thereof. Its width corresponds to the inner width of the hopper-like containment 31. The whole flap 41 is pivotable about the pivot axis 42 supported on the outer wall of the hopper-like containment 31 for example by an angle of 90°. This angle may also be up to 100°. In the start-out position 44 as shown in FIG. 9, the pivot flap 41 extends under the influence of gravity at least essentially vertically, so that its lower edge 43 has a distance from the bottom surface 37 of the hopper-like containment 31 of for example 2100 mm. The bottom edge 43 is then disposed for example 900 mm above a scrap metal pushing arrangement 51. In one or in both end positions, the pivot flap 41 may be prevented from further pivoting by straps which are arranged for example outside of the hopper-like containment 31. In this pivoted position, the pivot flap 41 may cover the suction channel 34 for example up to one half. In this way, even with the scrap metal 4 being blocked, the full exhaust gas volume flow can be sucked up via the suction channel 34.

At the lower end of the hopper-like containment 31, the scrap metal push arrangement 51 is disposed, see FIGS. 1-7. This comprises a scrap metal pusher arranged in the support frame 21 and a drive system 81.

The scrap metal pusher 52 comprises in the shown embodiment, a first outer pusher block 61 and an inner pusher block 101 guided thereon. The pusher block 61 is a hollow body and has an at least approximately trapezoidal enclosure contour. Herein the short sides are arranged at the bottom. The pusher block 61 is for example a welded structure, which is symmetrical with respect to a vertical longitudinal center plane. Its top side and its front surface 63 are planar. The side surfaces 64 have a straight lower area 65 and a guide area 66 which is curved about a straight axis, see FIGS. 5 and 7. The radius of curvature of the guide area 66 is for example larger than 2 m. The guide area 66 is provided, at least in sections, with slide plates 67, which are installed so as to abut slide plates 25 of the support frame 21. The slide plates 25 67 of this linear guide structure 55 may consist of steel or a wear-resistant metal alloy. Carbon inclusions may be provided for reducing the friction coefficient. Further slide elements are arranged for example at the essentially open bottom side 69.

The front plate 71 extends in the exemplary embodiment normal to the guide members 72. For example in the interior 73 of the slide block 61 two drive units 82, 92 may be mounted in the form of for example cylinder-piston units 82, 92. They form the drive system 81 of the scrap material pushing arrangement 51. The two identical, parallel cylinder-piston units 82, 92 have each a cylinder 84 supported on the support frame 21 by a pivot joint 83 and a piston 85 guided in the cylinder 84 and provided with a piston rod 86. The latter is supported in the slide block 61 via a pivot joint 87. In the exemplary embodiment, the piston stroke is about 6000 millimeter, the piston diameter 340 millimeter and the piston rod diameter 240 mm. When installed, the front plate 71 of the slide block 61 is in alignment with the inner wall surface of the hopper-like containment 31. The scrap metal pusher 52 extends for example horizontally and is disposed on the horizontal bottom surface 37.

Figure 4:
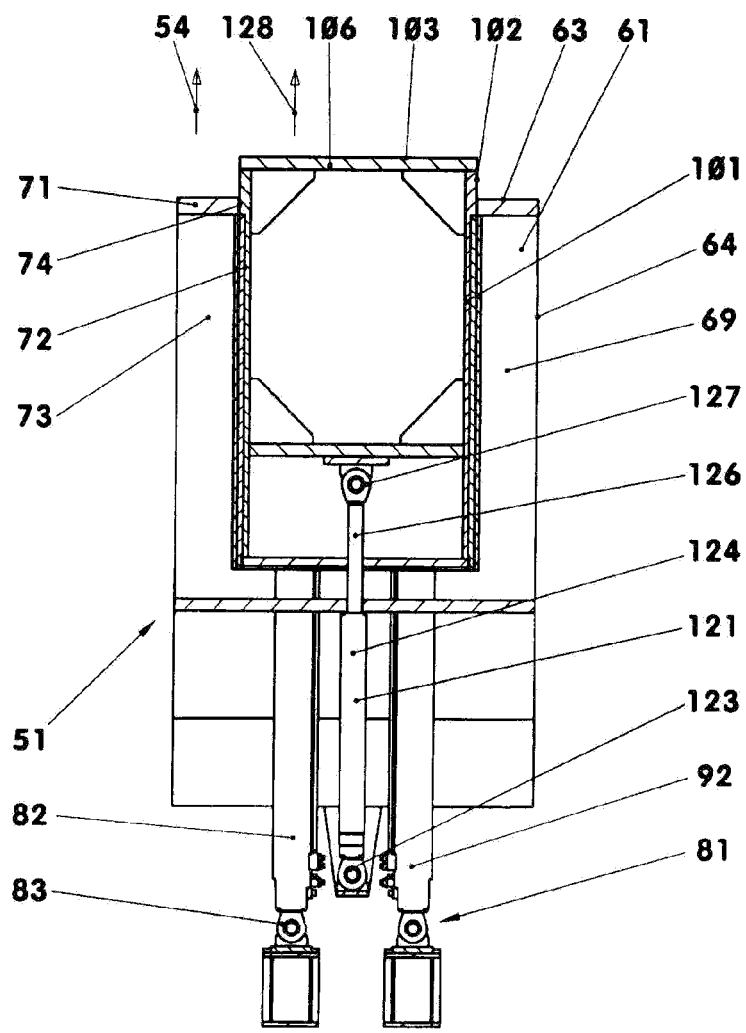
FIG. 4 shows a bottom view of the scrap metal advancing arrangement.
Figure 5:
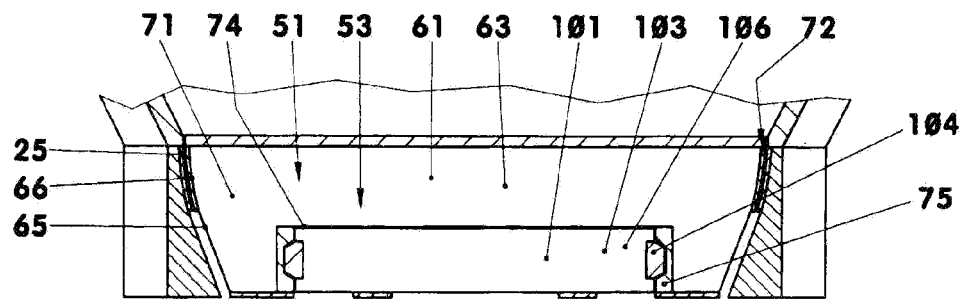
FIG. 5 shows a front view of the scrap metal advancing arrangement.

The front plate 71 has a cavity 74 from which, when installed, the pushing block 101 projects in its inserted position for example by 300 mm. The front surface 63 of the push block 61 may also be in alignment with the front surface 103 of the push block 101. The push block 101 is block-like shaped and arranged in the scrap metal push arrangement 51 at the bottom of the pusher block 61 as shown in FIGS. 1 and 4. The welded construction is for example symmetrical with the vertical longitudinal center plane. The hollow body 101 is provided at its front end with guide prisms 104. When installed, they are disposed in complementary guide cavities 75 of the push block 61. The upper and lower guide surfaces 105 of the guide prisms 104 extend for example at an angle of 60° relative to each other. The guide system 75, 104 may also be formed like the guide system of the push block 61. Also, the push block 61 may be guided by means of a prism guide structure for example in the support frame 21. Also, a roller guide arrangement is possible.

The front plate 106 of the pusher block 101 extends in the exemplary embodiment normal to the guide structures 75, 104. Their front surface 103 comprises 30% of the total pusher front face 53 which is composed of the sum of the front surface areas 63, 103 of the slide block 61 and the pusher block 101. The bottom edges of the two front surface areas 63, 103 are in alignment, the height of the pusher block front surface 103 is, in the representation of FIG. 5, 43% of the pusher front surface 53.

FIG. 8 shows a pusher block 101 with a projecting front face 108 in a top view. The two wing sections 108 forming the projection 107 extend at an angle of 174°. This angle may be between 150° and 180°. Also the front plate 71 of the pusher block 61 may foe provided with a projection. The projection 107 is oriented in the exemplary embodiment in a vertical direction.

At the rear side 109 of the pusher block 101, another drive unit 121 in the form of a cylinder-piston unit is arranged. In the shown embodiment the cylinder-piston unit 121 is supported on the pusher block 61 by a pivot bearing 123. The piston rod, 126 is supported on the pusher block 101 by way of a pivot bearing 127. The diameter of the piston 125 and the diameter of the piston rod 126 are in the shown exemplary embodiment equal to the values of the first drive unit 82, 92. As a result, the effective piston area 89 of a first cylinder-piston unit 82, 92 is of the same sire as the effective piston surface 122 of the second cylinder piston unit 121. The piston stroke is about half as large as the piston stroke of the first cylinder piston unit 82, 92. This stroke of the second piston cylinder unit 121 may be for example be between 40% and 60% of the stroke of the first cylinder piston unit 82, 92.

Figure 11:
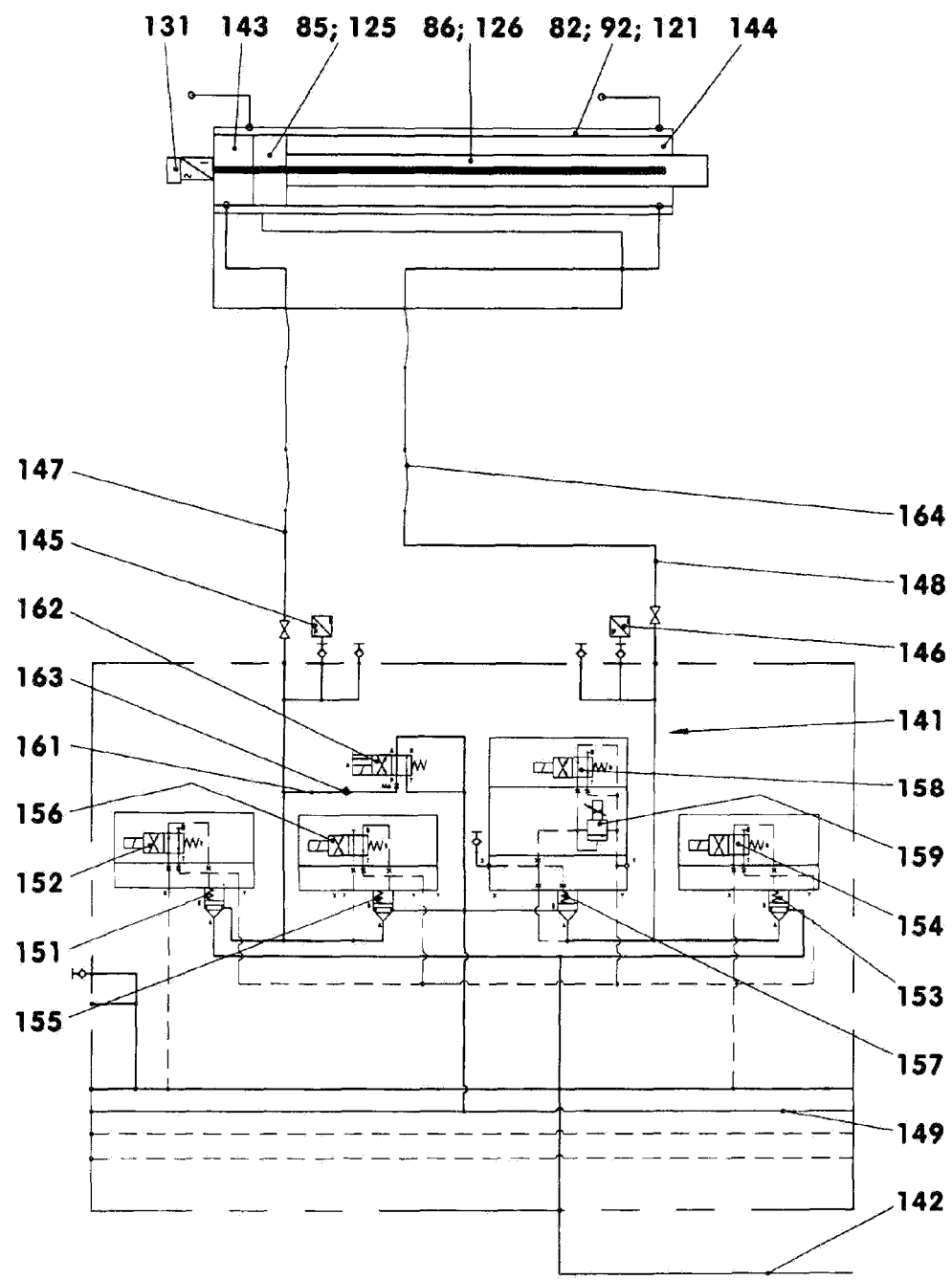
FIG. 11 shows a hydraulic control system for the cylinder-piston units.

All mentioned cylinder-piston units 82, 92, 121 are provided in the exemplary embodiment with a travel length measuring system 131, see FIG. 11. The cylinder-piston units 82, 92, 121 may be of the design as described herein or in the form of pull anchors. Instead of the joint bearings 82, 87, 123, 127 also pivot bearings may be used. Also, a one-sided flange mounting, a pivot pin etc. is may be used as mounting structure.

The hydraulic connection 132 between the second cylinder-piston unit 121 and the support frame 21 is established for example by way of hoses 133. In the exemplary embodiment shown in FIG. 1, these hoses 133 are disposed in a hose guide chain 134. However, the hoses may also be suspended.

The hydraulic control is such that the first drive unit (82, 92) and the second drive unit 121 can be controlled separately. For example, the central hydraulic device makes it possible to operate all drive units concurrently. The volume flow required herefor can be provided either by pumps or by a pressure reservoir. The maximum displacement speed is for example 150 mm per second. The tubing between the hydraulic valve setup and the cylinder-piston units 82, 92, 121 is established for example by tubes and hoses with a nominal diameter of 2 inches. The hydraulic medium is for example an inflammable liquid on the basis of water-glycol. Also, other hydraulic liquids such as hydraulic oil on mineral oil basis may foe used. The nominal pressure of the hydraulic system is for example $160 \times 10^5$ N/m².

The valve setup 141 of a double-sided cylinder piston unit 82, 92, 121 is shown in FIG. 11. The two other valve setups are of corresponding design. The pressure line 142 coming from the pumps is connected to two hydraulically controlled 2/2-way valves 151 153 with spring return. The respective control valve 152, 154 is in the exemplary embodiment an electromagnetic 4/2 way valve with spring return. At the outlet side, one of these valves 152 is connected to the piston side 143 and the other valve 153 is connected to the piston rod side 144. In each supply line 147, 148, a pressure sensor 145, 146 is arranged at the valve setup side. The supply lines 147, 148 include hoses 164 for accommodating movements of the cylinder piston units 82, 92, 121 relative to the valve setup 141 and the support frame 21.

To the supply lines 147, 148 in each case a hydraulically pre-controlled 2/2-way valve with spring return is connected which is in communication with the tank line 149. The pre-control valves 156, 158 may be of a design as described above. In the exemplary embodiment, the piston rod side tank valve 157 has an additional 2/2 pre-control valve 159.

The tank line 149 and the piston-side supply line 147 are interconnected by way of a bypass line 161. In this bypass line, an electromagnetically operated 4/2 way valve 162 with spring return and for example a check valve 163 are arranged.

After the scrap material basket is unloaded into the pre-charging chamber 22, the closure member 23 is closed. A push basket 26 first arranged in the pre-charging chamber 22 moves the scrap material 4 further using a drive 28 into the hopper-like container 31 while the separating wall 24 is opened at times. FIGS. 1 and 9 show the hopper-like container 31 while the separating wall 24 is opened at times. FIGS. 1 and 9 show the hopper-like container 31 filled with scrap metal. During operation of the electric arc furnace 5 at least a part of the exhaust gas generated during the melting process is suctioned through the scrap metal column 6 to the suction opening 33. The exhaust gas transfers in the process thermal energy to the scrap metal material 4, which is preheated thereby while the exhaust gas is cooled.

Figure 3:
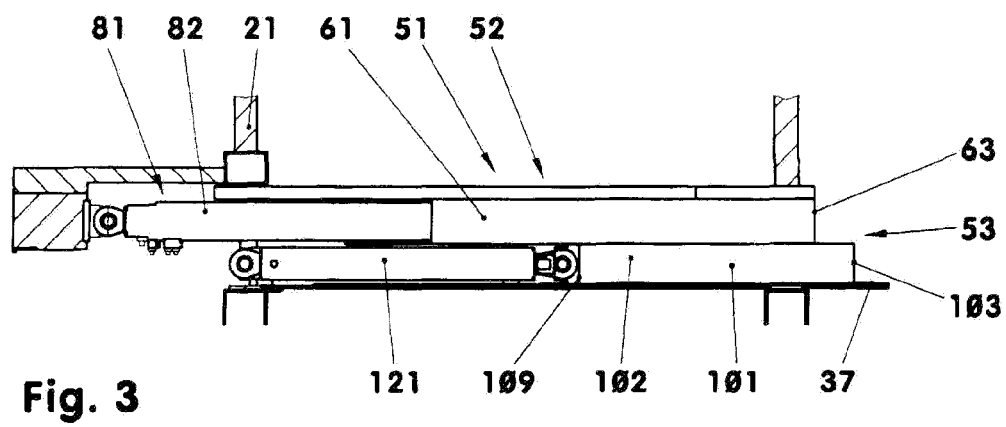
FIG. 3 shows the scrap metal advancing arrangement.

The scrap metal pusher arrangement 51 is retracted in its rest position. The scrap metal pusher 52 is shown in FIGS. 1 and 3 in its rest position. All cylinder-piston units 82, 92, 121 are retracted.

In order to move the scrap metal 4 from the hopper-like container 31 into the furnace containment 10, the scrap metal pusher arrangement is extended, see FIG. 6. To this end, the scrap metal pusher 52 is moved by the two cylinder-piston units 82, 92 from the position shown in FIG. 1 to the right. The scrap metal 4 is moved through the tunnel 35 toward the furnace containment 10. In this position, the scrap material 4 slides into the furnace containment 10 above the brick-lined wall 12 of the containment 10.

During movement of the scrap metal 4, the scrap metal presses against the lower area of the pivot flap 41—below the pivot axis 42. The pivot flap 41 is pivoted open in the process. The opening angle may be a part of the maximum pivot-open angle. The pivot flap 41 however may also be opened to its end position.

The scrap metal pusher 52 can be moved into the tunnel 35 up to one meter. The pusher block 101 which is movable relative to the pushing block 61 is movable toward the center of the furnace up to 100 mm beyond the brick-lined wall 12. Because of the long overall stroke, the tunnel 35 may be longer than one meter.

If one of the front plates 71, 106 is, or as shown in FIG. 8 both front plates are provided with projections, the scrap metal 4 can be moved in the furnace to a greater extend into the areas away from the electrodes 11. In this way, the chances of damaging the electrodes during charging can be reduced.

As soon as the scrap metal 4 has been moved into the furnace containment 10, the scrap metal pusher 52 is retracted to its rest position. The pivot flap 41 may under gravity control pivot back to its vertical position.

During movement of the scrap metal 4, its resistance to the movement may vary. This results in increases and decreases of the pressure in the hydraulic lines. At least the piston-side pressure sensor 145 has an upper pressure threshold value. As soon as the hydraulic pressure in the supply line 147 exceeds this threshold value the piston-side pre-control valve 152 and the piston rod-side pre-control valve 154 of the second cylinder-piston unit 121 are activated so as to open the valves 151, 153. The hydraulic medium supplied by the pressure line 142 displaces the push block 101 in the guide direction 123 relative to the push block 61. Prom the piston rod chamber 129, hydraulic fluid is displaced and flows back into the tank. In this way, the specific surface pressure on the front surface 103 of the push block 101 which extends normal to the guide direction 128 is greater by 60% than the specific surface pressure of the pusher front surface area 53 which extends normal to the pusher guide arrangement 54. As a result of the higher force, scrap metal 4 near the bottom which may be settled there can be moved toward the furnace containment 10. The scrap metal 4 disposed thereabove can then slide down after retraction of the push block 101.

During the outward movement of the push block 101, the hydraulic valves 151, 153 of the first cylinder piston unit 82, 92 continue to remain open. The scrap metal pusher 52 can then move further toward the furnace containment 10. As soon as the pressure in the hydraulic line drops below an upper back switch value, the valves 151, 153, 155, 157 of the second cylinder piston unit 121 are switched so that the second cylinder-piston unit 121 can again be retracted while the scrap metal pusher 52 continues to move out. This procedure may be repeated several times during the stroke of the scrap metal pusher 52. The pressure value of the upper threshold value may be higher than the pressure value of the back switch value, so that a resonance oscillation of the system as a result of frequent on and off switching is avoided.

Figure 10:
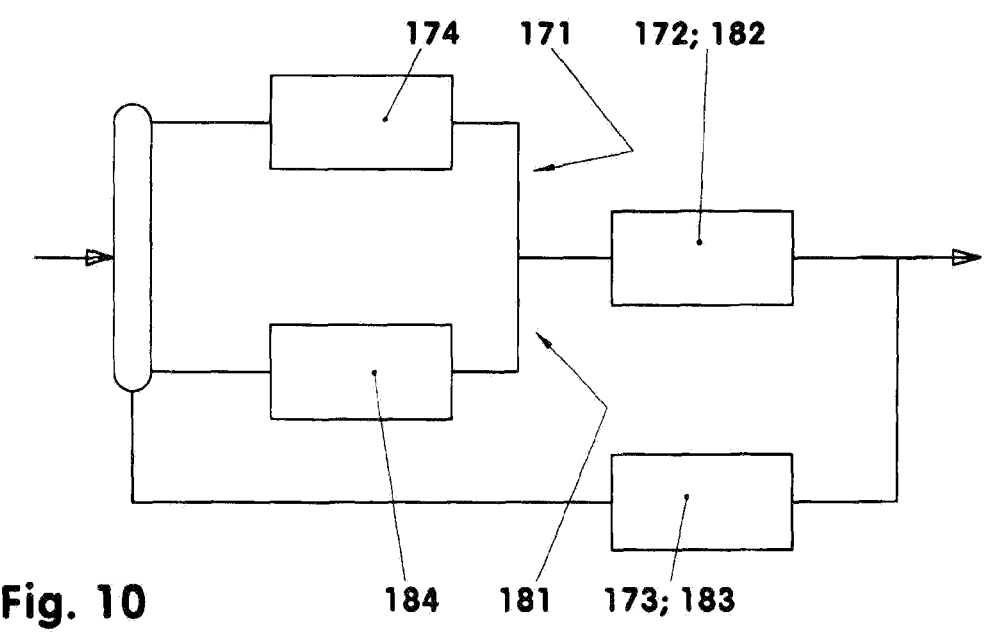
FIG. 10 shows a control circuit of the scrap metal advancing arrangement.

FIG. 10 shows the upper area of this control circuit 171. Herein, the scrap metal pusher 52 forms the control section 172. The pressure sensor 145 of the upper cylinder-piston unit 82, 92 is the measuring member 172 which activates the control member 174 that is, the cylinder-piston unit 121.

As soon as the piston side pressure sensor 145 drops below a lower threshold value, the piston rod side 144 is placed into hydraulic communication with the piston side 143 by switching over the 4/2 way valve 162. A check valve 163 in the communication line 161 prevents hydraulic fluid from flowing in the direction of the piston rod side 144. The force transmitted via the piston rod 144 now depends only on the piston rod diameter. The specific force of the pusher front surface area 53 effective on the scrap metal 4 is correspondingly lower. Because of the higher fluid volume flow into the piston-side cylinder chamber 88, in this differential pressure circuit the speed of the piston is increased at the ratio of the piston surface area to the piston rod cross-sectional area.

When the resistance of the scrap metal 4 increases again, the pressure of the drive system 81 sensed by the pressure sensor 145 also increases. As soon as the pressure exceeds a lower back switch threshold value, the differential pressure circuit is again switched off. The cylinder-piston units 82, 89 then operate again with the full piston surfaces 89 being effective.

In the lower area of FIG. 10 this control circuit 181 is shown. Also in this control circuit 181, the scrap material pusher 52 forms the control section 182 and the pressure sensor 145 of the first cylinder piston units 82, 92 forms the measured member 183. The control member 184 forms in each case the directional valve 162 for on-and-off switching the differential pressure circuit.

All cylinder-piston units 82, 92, 121 may be provided also with a piston-rod-side pressure sensor 146 which is connected in a control circuit.

Also, combinations of different exemplary embodiments are possible.

| | References: |
|---|---|
| 4 | Supply material or scrap metal |
| 5 | Electrode discharge furnace |
| 6 | Scrap metal column |
| 10 | Furnace containment |
| 11 | Electrodes |
| 12 | Brick lining |
| 20 | Charging chamber system |
| 21 | Support frame |
| 22 | Pre-charging chamber |
| 23 | Closure |
| 24 | Separating wall |
| 25 | Slide plates, guide part |
| 26 | Push basket |
| 27 | Funnel |
| 28 | Drive |
| 31 | Hopper-like container |
| 32 | Sidewall |
| 33 | Suction connection |

| | References: | |
|---|---|---|
| 34 | Suction channel | |
| 35 | Tunnel | |
| 36 | Wall of (31) | |
| 37 | Bottom area | |
| 38 | Control flap | |
| 41 | Pivot flap | |
| 42 | Pivot axis | |
| 43 | Bottom edge | |
| 44 | Rest position | |
| 51 | Scrap metal push arrangement | |
| 52 | Scrap metal pusher | |
| 53 | Pusher front surface | |
| 54 | Pusher guide arrangement | |
| 55 | Linear guide structure | |
| 61 | Slide block | |
| 62 | Top side | |
| 63 | Front surface | |
| 64 | Side surfaces | |
| 65 | Lower area | |
| 66 | Guide area | |
| 67 | Slide plate | |
| 68 | Slide elements | |
| 69 | Bottom side | |
| 71 | Front plate | |
| 72 | Guide member | |
| 73 | Interior | |
| 74 | Cavity | |
| 75 | Receiver guide | |
| 81 | Drive system | |
| 82 | Drive units | |
| 83 | Pivot joint | |
| 84 | Cylinder | |
| 85 | Piston | |
| 86 | Piston rod | |
| 87 | Pivot joint | |
| 88 | Piston-side cylinder chamber | |
| 89 | Piston area | |
| 92 | Cylinder piston unit | |
| 101 | Pusher block | |
| 102 | Longitudinal sides | |
| 103 | Front surface | |
| 104 | Guide prism | |
| 105 | Lower guide surface | |
| 106 | Front plate | |
| 107 | Projection | |
| 108 | Wing section | |
| 109 | Rear side | |
| 121 | Drive unit | |
| 122 | Piston surface area | |
| 123 | Pivot bearing | |
| 124 | Cylinder | |
| 125 | Piston | |
| 126 | Piston rod | |
| 127 | Pivot bearing | |
| 128 | Guide direction | |
| 129 | Piston rod chamber | |
| 131 | Travel length measuring system | |
| 132 | Hydraulic connection | |
| 133 | Hoses | |
| 134 | Hose guide chain | |
| 141 | Valve stop | |
| 142 | Pressure line | |
| 143 | Piston side | |
| 144 | Piston rod side | |
| 145 | Pressure sensor piston side | |
| 146 | Pressure sensor piston rod side | |
| 147 | Supply line piston side | |
| 148 | Supply line piston rod side | |
| 149 | Tank line | |
| 151 | 2/2 way valve piston side | |
| 152 | Control valve | |
| 153 | 2/2 way valve piston rod side | |
| 154 | Control valve | |
| 155 | 2/2 way valve piston side | |
| 156 | Control valves | |
| 157 | 2/2 way valve piston rod side | |
| 158 | Control valve | |
| 159 | 2/2 way control valve | |
| 161 | Bypass line | |
| 162 | 4/2 way valve | |
| 163 | Check valve | |
| 164 | Hose | |
| 171 | Control circuit | |
| 172 | Control area | |
| 173 | Measurement member | |
| 174 | Control member | |
| 181 | Control circuit | |
| 182 | Control area | |
| 183 | Measurement member | |
| 184 | Control member | |

What is claimed is:

1. A scrap metal push arrangement (51) with a scrap metal pusher (52) guided by a guide structure (55) in a linear guide direction (128) and with a hydraulic drive system (81) comprising at least one first cylinder-piston-unit (82, 92), the scrap metal pusher (52) having an effective pusher front surface area (53) extending normal to the linear guide direction (54), the scrap metal pusher (52) including at least one internally guided push block (101) supported in the scrap metal pusher (52) at the bottom thereof so as to be movably also in the linear guide direction (128) and also relative to the scrap metal pusher (52) and a second hydraulic cylinder piston unit (121) with a piston (125) which is movable relative to the first cylinder piston unit (82, 92) and has a front face area (122), the at least one internally guided push block (101) having an effective push block front face (103) also extending normal to the linear guide direction (128), and the quotient of the effective piston front face area (122) of the second hydraulic cylinder piston units (121) and the effective front face (103) of the at least one internally guided push block (101) being greater than the quotient of the effective piston surface areas (89) of all first cylinder piston units (82, 92) and the effective pusher front surface area (53).

2. The scrap metal push arrangement (51) according to claim 1, wherein the pusher block (101) is guided in a slide block (61).

3. The scrap metal push arrangement (51) according to claim 1, wherein the scrap metal pusher (52) is operated by first and second cylinder piston units (82, 92).

4. The scrap metal push arrangement (51) according to claim 3, wherein the effective piston surface area (89) of the first cylinder-piston unit (82, 92) of the effective piston surface area (122) corresponds to that of the second cylinder piston unit (121).

5. The scrap metal push arrangement (51) according to claim 1, wherein the stroke length of the internally guided pusher block (101) is at least 45% of the stroke length the scrap metal pusher (52).

6. The scrap metal push arrangement (51) according to claim 1, wherein the internally guided pusher block (101) has a front face (106) provided with a projection.

7. The scrap metal push arrangement (51) according to claim 1, wherein the hydraulic control of the cylinder-piston units (82, 92, 121) includes a switchable control circuit (171) having a control area (172) represented by the scrap metal pusher (52), a control member (172) corresponding to the second cylinder unit (121), and a measuring member represented by the pressure sensor (145) of the first cylinder-piston unit (82, 92).

8. The scrap metal push arrangement (51) according to claim 1, wherein at least the first cylinder-piston unit (82, 92) is controllable by means of differential pressure circuits.

9. A charging chamber system (20) with a hopper-like container (31) and with a scrap metal push arrangement (51) according to claim 1, wherein a wall (36) of the hopper-like container facing away from the scrap metal push arrangement (51) includes a pivot flap (41) with gravity return and the stroke of the scrap metal pusher (52) extends through the plane of the returned pivot flap (41).

* * * * *